March 14, 1933.    M. R. WELLS    1,901,213
METHOD OF MAKING TIRE CHAINS
Original Filed Dec. 15, 1930    4 Sheets-Sheet 1

Inventor
Merritt R. Wells
By Bates, Goldrick & Teare
Attorneys

March 14, 1933.    M. R. WELLS    1,901,213
METHOD OF MAKING TIRE CHAINS
Original Filed Dec. 15, 1930    4 Sheets-Sheet 2

Inventor
Merritt R. Wells
Bates, Goldrick & Teare
Attorneys

March 14, 1933.  M. R. WELLS  1,901,213
METHOD OF MAKING TIRE CHAINS
Original Filed Dec. 15, 1930    4 Sheets-Sheet 3

Inventor

Merritt R. Wells
By Bates, Golrick & Teare
Attorney

Inventor
Merritt R. Wells
By Bates, Golrick & Teare
Attorneys

Patented Mar. 14, 1933

1,901,213

UNITED STATES PATENT OFFICE

MERRITT R. WELLS, OF CLEVELAND, OHIO, ASSIGNOR, BY MESNE ASSIGNMENTS, TO THE McKAY COMPANY, OF PITTSBURGH, PENNSYLVANIA, A CORPORATION OF PENNSYLVANIA

METHOD OF MAKING TIRE CHAINS

Original application filed December 15, 1930, Serial No. 502,362. Divided and this application filed September 3, 1931. Serial No. 560,970.

This invention relates to a method for electrically welding metal parts together, and particularly by a weld of the resistance type. The invention is more specially concerned with a method of welding lugs to links of a chain, and is a division of my application for Letters Patent on an electric welding machine, Serial No. 502,362, filed December 15th, 1930.

Anti-skid tire chains for automobiles have long been in use, and have generally comprised a series of groups of cross links, the ends of which are usually hooked to a pair of circumferential bands or chains. Various types and kinds of cross links have been used, and it has been found that a very successful type is one having a plurality of chain links, to some of which are secured small lugs, which lugs are arranged to coact with the road surface, thereby providing additional traction to the wheels and preventing unnecessary skidding.

One of the objects of the present invention is to provide a method of manufacturing short chain sections, having links provided with projecting lugs and having attaching devices at the ends of the sections, so that the sections may be effectively used as the cross members of a tire chain, and I accomplish this result by welding lugs to some of the links of a continuous chain and thereafter severing portions of said chain and securing fastening devices to the extreme links of the severed portions.

Another object of the invention is to provide a method for automatically placing the lugs on a chain and welding them thereto in a manner which will greatly decrease the cost of manufacture of the chain, and at the same time insure a far better weld between the lug and the links.

Another object is to provide a method of producing groups of lugged links alternated with groups of plain links in a continuous chain, which is thereafter severed through certain plain links to produce individual sections. When operating on a continuous chain, my method applies lugs to a group of connected links and then leaves a group of connected links plain, and so on, alternately, and thereafter, by severing the chain through plain links, and the attachment of the fastening devices to the end links of the sections, which are plain, enables the production of the desired form of cross chain.

More specifically, an object of this invention is to provide a method which comprises welding lugs to groups of links in a chain being fed, and thereafter feeding a group of links without the attachment of lugs, the feeding of such unlugged groups being in a cycle corresponding to the feeding of one link having lugs; so that the chain, with alternate groups of lugged and unlugged links, may be produced quickly and economically. This method provides for varying the number of lugs and unlugged links as desired, there being preferably an odd number of unlugged links in the group. In making a cross chain section from such continuous chain, I sever the continuous chain through the middle unlugged link of a group and apply attaching devices to the terminal unlugged link of the severed section.

The embodiment of the apparatus illustrated in the drawings hereof is substantially the same as that shown in my prior application, the construction being such as will carry out my method successfully. This apparatus comprises means for feeding a continuous length of chain to a suitable welding mechanism, to which individual lugs are fed, preferably a pair at a time, and placed in position on top of a link of the chain; means for simultaneously welding the pair of lugs to the diagonally opposite corners of the link, the chain being then advanced a distance of one link and the operation repeated until the desired number of lugged links has been provided; and means for then feeding at one operation a plurality of links of the number desired for unlugged links in the chain plus one, and then applying lugs to the last link of this group which becomes the first link of the next lugged group. Thereafter, I sever the chain in the region of the unlugged portion into small sections, which constitute the main portion of the cross chain members of the tire chain. These cross chains thus comprise a central portion having links to which lugs have been welded, and end portions which have no lugs. Hooked links are then secured to the ends of such cross chains, and the chains are put in place on circumferential bands or chains which constitute the retaining means to keep the chain in place on the tire.

This invention will become apparent from the following description, referring to a preferred mechanism used in carrying out my improved method, and which is illustrated in the drawings. The essential novel features of the method will be set forth in the claims.

My improved method for making cross chains for tire chains comprises feeding a continuous chain of plain connected links, a distance of one link, and applying a pair of lugs to opposite corners of the link so fed, thereafter electrically welding such lugs simultaneously to the link and repeating the operation for successive links. Then, after a predetermined number of consecutive links have had lugs welded to them, I feed the chain a distance covering one more link than is required for the number of unlugged links. This last feed is effected in a cycle of operations, corresponding to each of the preceding cycles. I then weld a pair of lugs onto opposite corners of the last link of the group, which last link becomes the first lugged link of the next succeeding group and leaves a predetermined number of plain links between this group and the preceding group.

As a subsequent operation, I sever the chain in an intermediate link of the plain group, and so produce short chains, each having an intermediate group of lugged links and one or more plain links at each end thereof. Thereafter I apply attaching devices to the terminal plain links of such short chains. The chains are then secured to the usual circumferential chains, which act to bind my cross chains together for use.

In the drawings, I have shown an apparatus arranged to carry out my improved method. This apparatus comprises, as shown, a main frame 10, arranged to support the different units of the welding mechanism, namely, a power shaft, a chain feed unit, a lug feed unit, a welding bed, and an electrode assembly. The frame 10 comprises a table-like structure supported by suitable legs 12, and provided with cross frame or bracing members 14, to act to the rigidity of the structure.

Figures 1, 2:
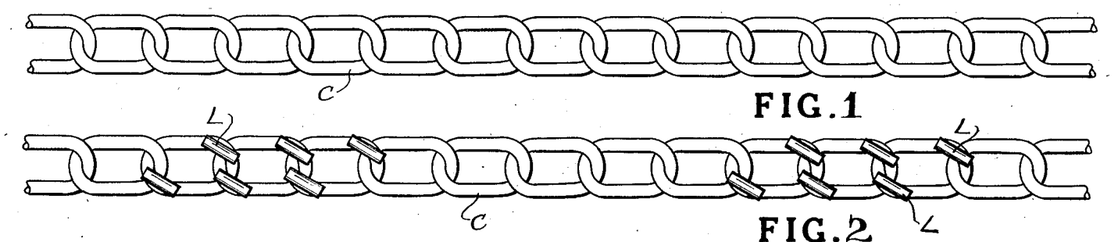
Fig. 1 is a plan of chain used in forming the cross chain.
Fig. 2 is a plan of the chain having lugs welded on links at spaced intervals.
Figure 3:
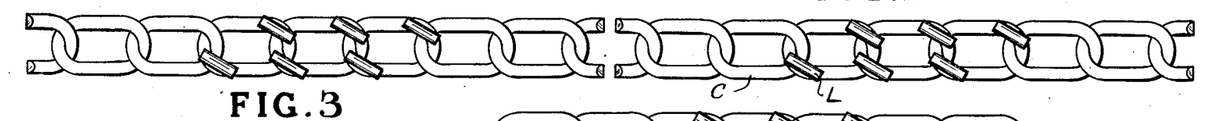
Fig. 3 is a view of the chain shown in Fig. 2, after it has been separated into short cross chain sections.
Figure 4:
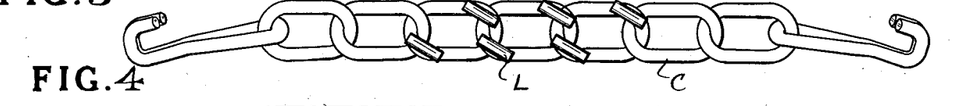
Fig. 4 is a plan of a complete cross chain.
Figure 5:
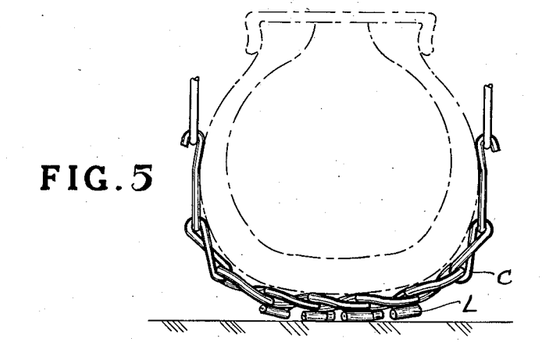
Fig. 5 illustrates the chain in use.
Figure 6:
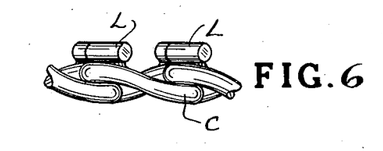
Fig. 6 is a side elevation of a section of a chain having the lugs welded thereon.
Figure 7:
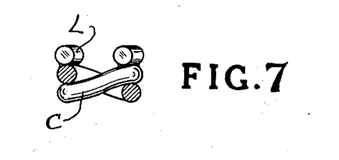
Fig. 7 is a transverse section through a lugged portion of the chain.
Figures 8, 9, 10:
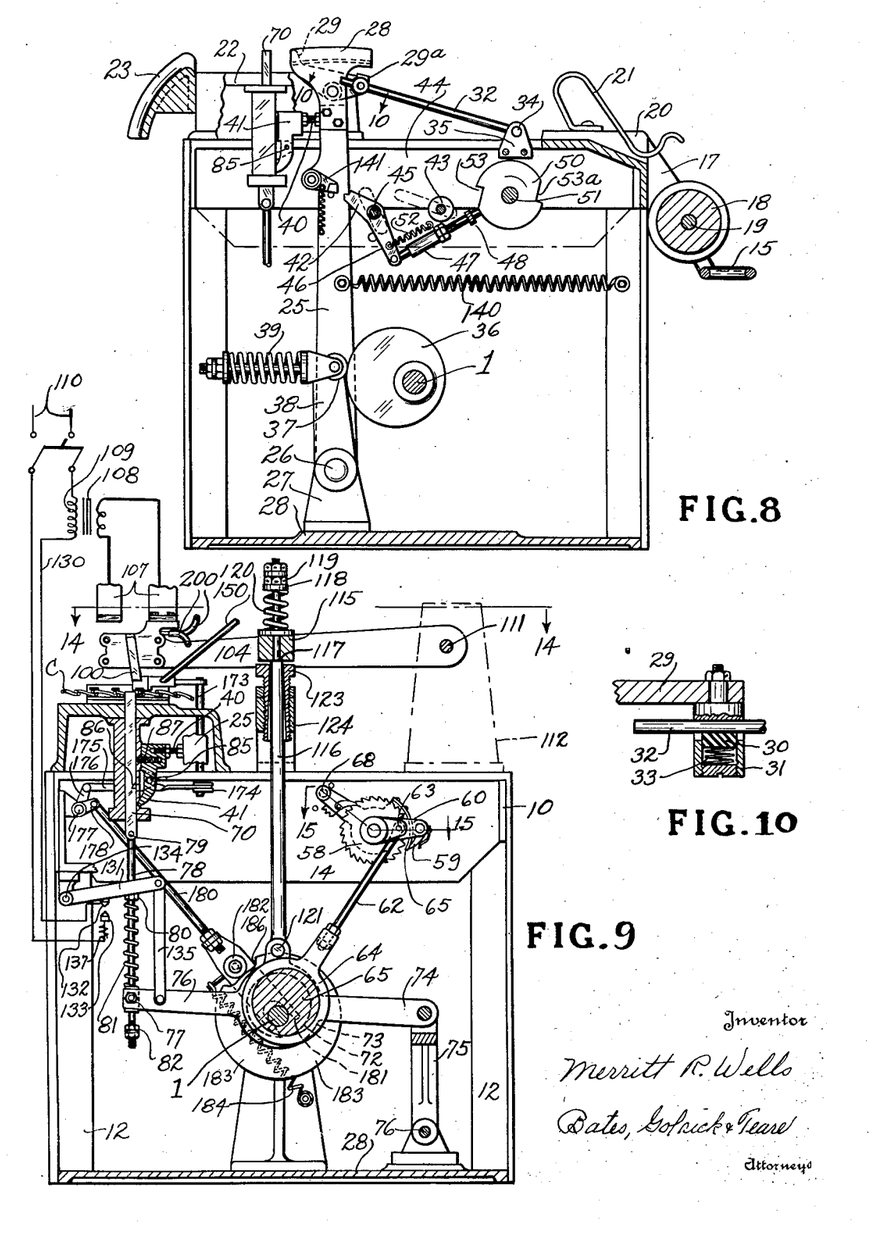
Figs. 8 and 9 are substantially vertical sections, through an apparatus capable of carrying out my improved method.
Fig. 10 is a sectional detail, as indicated by the lines 10—10 on Fig. 8.

The chain to which the lugs are to be welded is supplied in substantially continuous lengths and may be stored in suitable containers, (not shown). The chain passes upwardly from a container through a guide loop 15, carried by a bracket 17 adjacent one side of the frame, and passes over a pulley 18, journalled on a shaft 19, carried by such bracket. From the pulley 18 the chain passes over a suitable grooved guideway 20, and is held in contact therewith by a flat spring 21. From the guideway 20 the chain passes across the machine to a welding bed 22, which is mounted on top of the machine adjacent the left hand side, as shown in Figs. 8 and 9. This welding bed is provided with suitable guideways, and lug feeding means, hereinafter described, and has a flanged guide member 23, which extends from the bed to the left-hand side of the machine, and acts to carry the chain to a position to drop into a suitable container arranged to store the lugged chain. The arrangement is such that the stretches of chain which overhang the machine on opposite sides will hold the chain taut over the welding bed, which is raised slightly above the top of the machine.

In carrying out my improved method, the chain is fed across the table from right to left, (Figs. 8 and 9) by a suitable feeding arm or lever 25, which feeds a link, or a predetermined number of links, as desired, across the welding bed 22, in each cycle of operation of the machine. The feeding arm 25 is pivoted on a cross shaft 26, journalled in a bracket 27 carried by the base 28 of the machine. Adjacent the upper end of the lever or arm 25 is a channel shaped shoe 28, arranged to guide the chain on the lever. The shoe 28 is interposed between the pulley 18 and the welding bed 22, and engages the chain at all times.

The chain is gripped for feeding by a pawl 29, which is pivotally mounted in a slot formed in the shoe and is arranged to enter the links of the chain C. When the arm 25 is drawn to the rear, the pawl 29 is withdrawn from engagement with the chain by a suitable friction device. Such device is best shown in Figs. 8 and 10, and comprises a shoe 30, carried in a stud 31, which is pivoted to a rearwardly extending arm 29 of the pawl. The shoe is held in engagement with a rod 32, by a suitable compression spring 33, carried in the stud. The rod 32 is pivoted at 34 to a bracket 35, secured to the frame, some distance to the right of the lever 25. The construction just described is such that as the lever 25 swings to the right (from the position shown in Fig. 8) the pawl 29 is rocked counter-clockwise, thereby withdrawing the nose of the pawl from engagement with the chain. The pawl is maintained in this withdrawn position until the lever starts to swing in a reverse or forward direction, towards the left, (to the position shown in Fig. 8), at which time the pawl is rocked clockwise, thereby causing the nose thereof to enter a link in the chain and carry it forward with the lever 25.

The lever 25 is swung by a cam 36 through the medium of a roller 37, which is carried by a lever 38, having a resilient connection 39, with the arm 25. This resilient connection permits the forward stroke of the lever to be adjusted by a threaded stud 40, mounted in a latch 41, pivoted to the welding bed 22, and serving a purpose hereinafter to be described. The position of this stud 40 is such that the lever 25 will strike it on its forward or left hand stroke and arrest its movement to carry the chain forward to a predetermined position.

The arrangement of the mechanism is such that I may weld lugs on a selected number of consecutive links and then skip a selected number of links, and so on. My improved method contemplates feeding the chain a link at a time, until sufficient lugged links have been fed consecutively to care for the predetermined number of lugged links, and then feeding, at one cycle of operation, of the feeding mechanism, a plurality of links, the last one of which becomes the first of the succeeding group of lugged links. This feeding operation described allows the welding operation to be performed by my improved method at a high rate of speed, as it permits it to be carried on at every cycle of operation of the machine, there being no extra cycle to feed the several links which do not require lugs to be welded thereon. This is accomplished by providing a variable rearward limit for the feeding arm 25, as about to be described.

In the embodiment illustrated, the feeding arm 25 is positively driven in a feeding direction by the cam 36, but is returned by a spring 140, one end of which is secured to the arm 25 and the other to a suitable frame member. The spring also causes the roller 37 to be normally maintained in contact with the cam 36. When the links are fed one at a time, a pawl 141, pivoted to the lever, engages a suitable stop 42, carried by a frame member and prevents further rearward movement of the lever. However, when a plurality of links are to be fed, the stop 42 is automatically withdrawn and the arm 25 moves to the rear (to the right in Fig. 8), beyond the normal position of the stop 42 and engage a stop 43, which is adjustably carried by a suitable frame member 44.

The arrangement of the stop 42 is such that it is automatically withdrawn when a predetermined number of links have had lugs welded thereon. To this end the stop is pivoted to a stud 45, carried by the frame member 44, and is provided with a downwardly extending arm 46, to which is pivoted a link or plunger 47. The plunger 47 is slidably mounted in a bearing member 48, carried by the frame member 44 and its rearmost end is arranged to contact with the periphery of a cam disc 50. A suitable spring 52, secured to the arm 46 of the stop 42 normally maintains the contact between the plunger 47 and the cam 50.

In the construction shown, the periphery of the cam 50 is provided with two notches, 53 and 53a, and as the disc is rotated, as will hereinafter be described, the notches are presented to the plunger and the spring 52 carries the plunger rearwardly, thereby swinging the stop 42 about its pivot, permitting the passing of the pawl 141 over the stop 42 and bringing the arm 25 into contact with the stop 43.

Figures 15, 16:
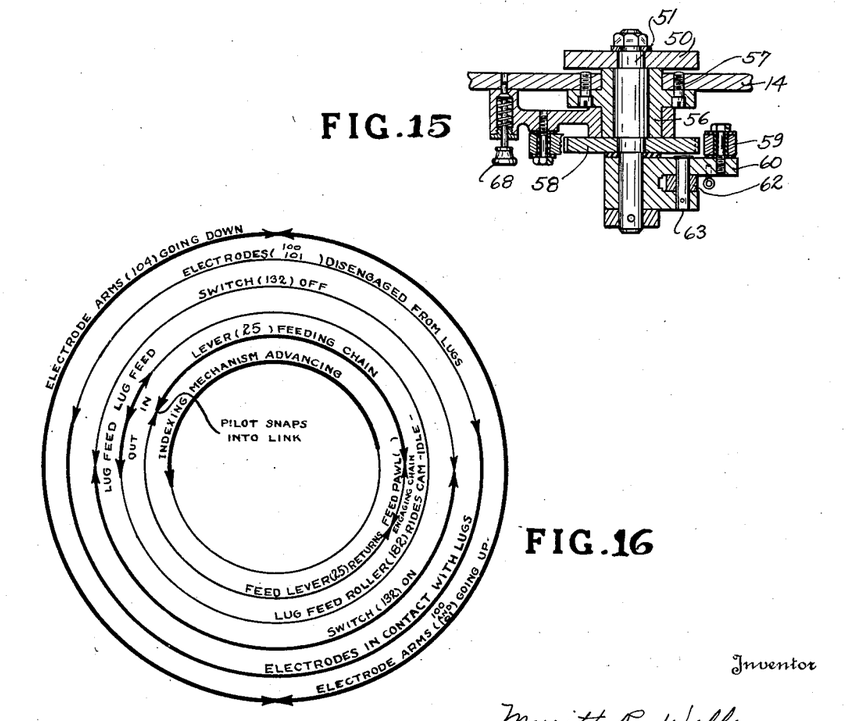
Fig. 15 is a sectional detail, taken substantially along offset lines 15—15 on Fig. 9.
Fig. 16 is a diagram and illustrates the timing of the various steps of my method and the order of movements of the mechanism for one cycle of operation.

A suitable indexing mechanism is provided to rotate the cam disc 50. Referring to Fig. 8 and Fig. 15, the disc 50 is rigidly mounted on a shaft 51, rotatably carried by a bracket 56, secured to the frame member 44 by suitable bolts 57. Rigidly secured to the shaft 51 is a rachet wheel 58, which is arranged to be rotated by a pawl 59, carried by an arm 60, journalled on the shaft 51. The arm 60 is pivotally mounted on the shaft 51 and is swung back and forth to feed the ratchet by a lever 62. This lever is pivoted to the arm 60 as at 63, and carries, on its lowermost end, a cam ring 64, arranged to embrace a disc cam 65, which is rigidly secured to the main driving shaft 1.

The construction is such that the ratchet 58 is caused to be moved a predetermined number of teeth for each cycle of operation of the machine, so that the links may be fed, one at a time, for a predetermined number of cycles, and then a plurality of links fed at one cycle. If, for example, three links are to be fed consecutively, it is apparent that because there are two oppositely disposed notches in the cam disc 50, the ratchet wheel must be given one-sixth of a rotation. I determine the amount of the feed of the ratchet 58 by providing a guard 65, which is adjustable about the axis of the ratchet wheel and serves to withdraw the pawl at a predetermined point on the rear stroke thereof.

The parts, as shown in Figs. 8 and 9, are in a position to have a lug placed upon the first lug-link of a three-link group. The plunger 47 has passed from the notch 53 by an angular distance of 60 degrees. On the first cycle of operation, the lugs are welded on the link so positioned, and as the lever 25 advances to feed the next link, the ratchet 58 is again advanced 60 degrees to a position where the plunger is 120 degrees from the notch 53, the guard being retained in the position shown in Fig. 9, by a pin 68. The lugs are now welded on the second link, and the return or non-feeding movement of the lever 25 is stopped by the member 42, which permits it on its next forward movement to feed only one link as before. Simultaneously, with this next feeding movement, the ratchet 58 is advanced an additional 60 degrees. Lugs are now welded on this link, making three consecutive links with lugs welded thereon.

The ratchet has now been advanced 180 degrees. At this period the plunger 47 has entered the recess or notch 53a, which is spaced 180 degrees from the notch 53, thereby causing the spring 52 to withdraw the stop 42 from the path of the pawl 41 and permit the spring 140 to return the lever 25 beyond the stop 42 into engagement with the stop 43.

In the setting shown in the drawings, the stop 43 is positioned so as to permit the lever 25 to pick up six links and feed them across the welding table, bringing the sixth link to a position to have lugs welded thereon. This feeding movement will advance the ratchet 60 degrees from the notch 53a, thereby bringing the stop 42 again into active position and the parts to substantially the same relative position as shown in Fig. 8.

Immediately after the chain has been fed to the welding table, it is accurately positioned so that the lugs may be placed thereon in proper relationship to the links. This is accomplished by a pilot member 70, best shown in Figs. 8 and 9. The pilot 70 comprises a bar slidably mounted in a vertically extending slot in the frame of the welding table 22. The upper portions of the pilot bar 70 is of such a shape as will conveniently enter the link in a chain, and the upper corners thereof are bevelled, so as to guide the link and position it on the pilot head, thereby accurately aligning it.

The pilot is operated, or reciprocated in an up and down movement, by a cam 72, rigidly secured to the main drive shaft 1, and which rotates within a ring portion 73 of a beam 74, the rearmost end of which is pivoted to a link 75, which in turn, is pivoted to a bracket 76, carried by the base 28 of the frame. The forward or left-hand portion 76 of the beam 74 carries a pivot pin 77, through which a link or rod 78 is slidably mounted. The uppermost end of the rod 78 is pivoted as at 79 to the lowermost end of the pilot bar 70. Intermediate its ends the rod 78 has a fixed collar 80, between which collar and the pivot pin 77 is a compression spring 81, which normally acts to retain the bar 70 is an uppermost position. As the arm 76 of the beam is rocked to a lowermost position, the pivot pin coacts with a nut 82 on the rod and positively withdraws it downwardly.

The pilot bar 70 is normally locked in a downward position by the latch 41, heretofore mentioned. The latch 41 is pivoted at 85 to the frame 22 and has a nose arranged to normal.y be held in engagement with a notch 86 of the plunger 70 by a spring 87. At such time as the lever 25 nears the end of its feeding stroke (to the left in Fig. 8) it contacts with the stop pin 40, previously mentioned, and swings the latch into a non-engaging position, thereby permitting the spring 81, which has previously been compressed by the upward movement of the beam 76 to snap the pilot bar 70 upward through the link with comparatively great speed.

Figures 11, 12:
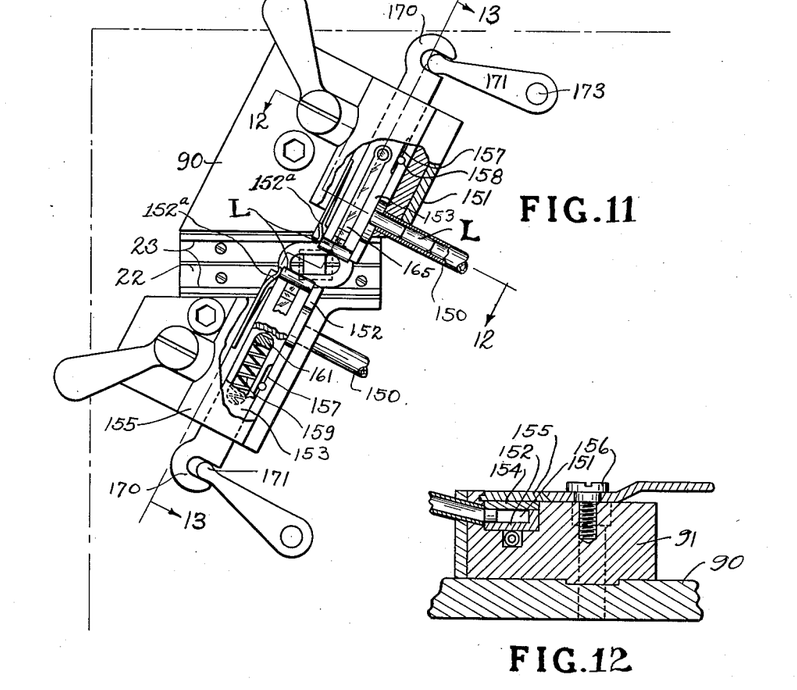
Fig. 11 is an enlarged detail of the welding table in which the chain is held during the welding operation.
Figs. 12 and 13 are detailed sections on an enlarged scale of the welding table, as indicated by the lines 12—12 and 13—13, respectively, on Fig. 11.
Figure 13:
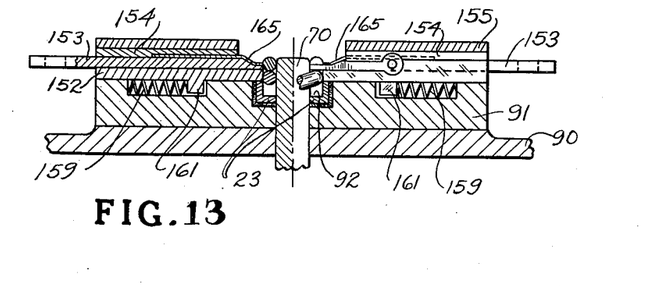

The welding table 22 comprises a bed 90, Figs. 11 to 13, on which is mounted, by suitable bolts, a guide block 91, through which is cut a channel 92, arranged to serve as a guide for the chain, and into which channel the pilot 70 projects and engages the chain.

After the pilot 70 has positioned a link, the lugs indicated at L in the drawings are fed by suitable means, hereinafter described, which superimposes the lugs upon opposite or diagonal corners of the links, as illustrated in Fig. 11. Electrodes of respectively opposite polarity are then brought into contact with the lugs and a welding current applied, thereby simultaneously welding both lugs to the link. The link itself carries the current from one weld to the other.

Figure 14:
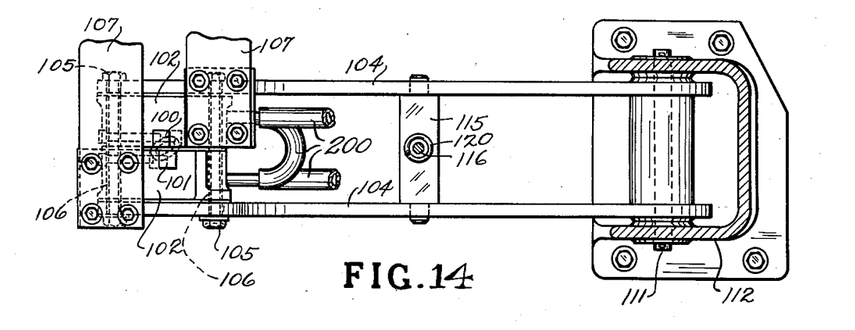
Fig. 14 is a horizontal section, illustrating the electrode arm and its mounting as indicated by the lines 14—14 on Fig. 9.

In the embodiment shown in Figs. 9 and 14, there are two electrodes 100 and 101, mounted in substantially vertical slots in electrode carriers 102. The carriers 102 are separated from each other by a suitable insulation and are likewise insulated from their mounting arms 104. The arms 104, the electrodes 100 and 101, and carriers 102 are retained together in the unit by suitable bolts 105, which pass through the arms and carriers and are insulated therefrom by a suitable insulating sleeve 106. Thus it will be seen that the electrodes are insulated from each other, as well as from the various supporting mechanisms. The electric current is carried to the electrode carriers by flexible laminated straps 107, which are connected to the opposite poles of the secondary winding of a transformer unit 108, the primary winding 109 of which is connected to a suitable source of current supply 110. If desired, the electrode carriers 102 may be hollow to the end that they may be cooled by a suitable cooling medium which may be forced through suitable flexible conduits 200, shown in part in Figs. 9 and 14.

In the embodiment shown, the lugs L are short cylindrical pieces and are positioned on diagonally opposite corners of the links at an angle of substantially 27 degrees to the axis of the chain. Hence, it has been found advantageous to mount the electrode carrying arms 104 at an angle of 27 degrees from the path of movement of the chain. The electrodes 100 and 101 are mounted on the forward or left-hand ends of the arms 104, the rearmost ends of which are pivotally mounted on a pin 111, carried in an upstanding bracket member 112, secured to the frame in any suitable manner. The arms 104 are reciprocated or swung vertically in a manner which will raise the electrodes clear of the lugs and thereafter bring them down into contact with the lugs and increase the pressure of the lugs as the welding current softens the work, thereby insuring a most effective welding of the lugs to the link.

The electrode carrier assembly is rocked by a cam secured to the main drive shaft 1. Pivotally mounted to the arms 104, intermediate their ends, is a block 115, through which a bar or rod 116 passes. The bar 116 has a shoulder 117, which normally abuts the lower or bottom face of the block 115. The uppermost end of the rod 116 extends above the block and is provided at its upper end with a washer 118 and an adjusting nut 119, while disposed between the washer and the block is a suitable compression spring 120, which surrounds the rod and normally serves to retain the shoulder 117 of the rod 116 in position against the bottom surface of the block 115.

When the welding electrodes are moved upward, the shoulder 117 is forced against the block 115 and positively swings the arm 104 upward and carries the electrodes a short distance above the chain, in which position the chain may be advanced without interfering with the electrodes. When, however, the rod 116 is pulled downward to bring the electrodes into contact with the lugs L, the arms 104 are moved downward until the electrodes abut the work, and then, as the heating current is applied to the electrodes, further downward movement of the rod 116 causes the compression of the spring 120, thereby increasing the pressure on the electrodes and forming the welds under compression.

The electrodes are operated from the main drive shaft 1. As shown in Fig. 9, the rod 116 is pivotally connected as at 121, to an ear on the ring 73, of the beam 74, which is swung or oscillated by the cam 72, as heretofore described. The downward movement of the electrodes is limited by a suitable stop 123, carried in a frame member 124, and through which the rod 116 passes. This prevents excess pressure of the electrodes on the lugs and links and eliminates undue distortion of the links. The stop 123 is adjusted so that the head 117 contacts with the lower surface of the block 115 when the electrodes have reached the lowermost position consistent with a good weld combined with the minimum amount of distortion of parts. Thereafter the continued downward movement of the rod serves only to compress the spring 120 and has no further effect on the arm 104 or the parts being welded.

To conserve electrical energy, the welding current is supplied to the transformer 108 only during the actual welding operation. To this end one side of the input line leading to the primary winding of the transformer 108 is connected by a line 130 to a movable contact arm 131, of a suitable switch 132. The other contact 133 of the switch is connected to the source of current supply.

The switch 132 may be of any suitable type. As shown in Fig. 9, the movable member 131 of the switch comprises a link pivoted to the frame at 134, and connected by means of a second link 135, to the arm 76 of the beam 74, heretofore described. The arrangement of the linkage is such that when the electrodes 100 and 101 reach the work, the contact of the switch is made and an electric circuit established to the transformer 108. One of the switch members, such as the contact 133, is preferably supported by a spring or resilient member 137, so that the continued movement to the beam 74, after the contact is made, will retain the switch in its active position without damage to the parts thereof.

The lugs L are fed to the welding table 22 from a pair of tubes, 150, Figs. 9, 11 and 12. Lugs may be supplied to the tubes 150 from a suitable feed hopper, or manually, and are conveyed by the tubes to a pair of channels 151, in the welding table 22. The channels 151 are disposed on opposite sides of the chain and are offset relative to each other so that the lugs may align with the diagonal corners of the links, as shown in Fig. 11.

Slidably mounted in each channel 151 is a channel-shaped bar 152, each of which carries a flat plunger bar 153, and is covered by a suitable cover plate 154. Suitable plates 155 secured to the top of the table 22 by bolts or screws 156 act to retain the channel bars and plungers within their respective grooves 151. The plungers and channel bars are reciprocated by a suitable mechanism, hereafter described.

When the chain is being fed across the table 22, the plungers are drawn away from the chain, and one end of a recess 157 in each of the plungers engages a pin 158 mounted in the corresponding channel bar and retains the bar in a withdrawn position. When the chain comes to rest and the pilot 70 enters the links, the plungers 153 are brought toward the links, and a spring 159 acts on pins 161, which are integral with the channel bars, and urges the channel bars against the links, thereby accurately positioning the links against the pilot.

The lugs L are fed from the tube 150 through slotted openings in the sides of the channel bars 152, and as the lugs are fed into the channel bars they underlie flat springs 165, carried by the cap 154, and which serve to keep the lugs in contact with the channel bars and retard their movement, thereby preventing inadvertent displacement due to the speed of the mechanism. In this position the bottom face of each lug is in a plane slightly above the top of the link, where it is held by its opposite ends, which are gripped between the side wall 152 and a leaf spring 152a. As the plunger bars 153 are moved towards the link, each plunger forces a lug from beneath its respective spring onto the link, where the lugs are immediately gripped by the electrodes 100 and 101.

When the lugs have been positioned on a link of the chain, the top surface of the pilot is a short distance below the top of the lug, thereby preventing contact between the pilot and the electrode. However, as soon as the lugs are positioned and the electrodes have gripped the lugs, the pilot 70 and plungers 153 are withdrawn and the welding operation takes place. Thereafter two more lugs are fed to the channel bars and the chain is advanced, bringing another link into position to be engaged by the pilot, and the cycle of operation begins anew.

The lug feed, namely the plungers 153 and their associated parts, is operated from the main driving shaft 1. Each plunger 153 has, as shown in Fig. 11, a hook portion 170, which projects from the outer ends of respective channels 152. The hooks 170 embrace the rounded ends of arms 171, which are rigidly secured to vertically extending shafts 173, (Figs. 9 and 11). The shafts 173 extend vertically through the welding bed 22 and have, rigidly secured to their lowermost ends, suitable horizontally extending arms 174, which are connected by links 175 to levers 176, which are rigidly secured to a rock shaft 177.

The rock shaft 177 is operated by a cam mechanism which is associated with the main drive shaft 1. Rigidly secured to the rock shaft 177 is a lever 178, which is pivotally connected to an end of a bar 180, the other end of which is forked as at 181, and embraces the main shaft 1. The bar carries a suitable roller 182, which is drawn into contact with a cam 183, rigidly carried by the main shaft 1, by a suitable compression spring 184. As the shaft 1 rotates, the cam roller 182 will be drawn into a recess 186 in the periphery of the cam, once for each cycle of operation of the machine, thereby causing the lugs to be fed by the plungers 153 to the chain link.

I will now summarize the timing of the various operations and steps of my improved method, with relation to the mechanism shown in the drawings, reference being had to the views showing the respective parts and also to the timing diagram of Fig. 16, in which the heavy lines indicate the action of the operations named thereon, and the light lines indicate idle conditions thereof. A complete rotation of a radial line about the center of the diagram indicates one cycle of operation of the machine, and at any given portion of said cycle the condition is indicated by respective heavy or light lines crossing the radius in that position.

We will assume that the parts are in the following positions: The feed lever 25 is in its rearmost position, and is raised to start the feed to engage the chain for a new purchase thereon. The lug feeding mechanism is idle. The electric current control or switch 131 is in an "off" position. The electrodes 100 and 101 are leaving contact with the lug, while the electrode-carrying arms 104 are being raised free from the links which have previously been welded. The operation from this position is as follows:

The switch contacts are separated, thereby cutting the current from the electrodes 100 and 101. The electrodes are then carried upwards, clearing the lugs. While the electrode-carrying arms 104 are moving to their uppermost positions and start downward, the chain feeding arm 25 functions to engage the feeding of the chain. The lug feed next comes into operation to initiate the feeding movement of the lugs from the channels to their relative positions on links of the chain. While the lugs are being fed, the chain feed stops, and the pilot 70 snaps into place to position a link of the chain. The channel members 152 also snap into position to retain the links against the pilot. The lug feed continues in movement until the lugs are placed on a previously positioned link of the chain. The electrodes are then brought into contact with the lugs, and the lug feeding mechanism begins to withdraw to clear the electrodes. While the lug feeding mechanism continues to withdraw, the switch 132 is turned on. The electrode arms 104 are then coming down and pressure is applied through the spring 120 to the lugs, thereby welding the lugs to the links. The chain feed lever 25, during this time, has started on its return movement to pick up another link. This cycle of operation is then complete, and the next feeding movement of the chain begins another cycle.

It will be observed that my method of welding two lugs to a link simultaneously, with positive and negative electrodes engaging the lugs and the link carrying the current between them, produces a uniform welding action on the two lugs, as well as allowing great speed of operation. Moreover, by reason of the constantly acting spring-pressure during the welding operation I obtain a very effective weld. Likewise, I am able to feed the entire group of plain links, together with the link to form the first of the next welded group, in a single cycle of operation of the mechanism, so that the machine goes on in repeating cycles, one for every welded link, and without the loss of time for feeding the various plain links. This method of operation is therefore rapid and effective.

I claim:

1. In the method of making tire chains, the steps of holding a link of a chain by means engaging its interior, simultaneously feeding a pair of lugs on opposite regions of a link, simultaneously welding the lugs thereto while pressing them against the lugs and while supporting the link on the opposite side.

2. In the method of making tire chains, the step of electrically welding a pair of lugs on opposite regions of a link, while pressing the electrode toward the lugs and supporting the link on the opposite side to enable such pressure to give a predetermined set to the last link.

3. The method of applying lugs to a chain link, comprising holding a link by means occupying its interior, placing a pair of lugs in contact with a link so held, and bringing a pair of electrodes of opposite polarity into contact with the lugs and applying current to pass from one electrode through one lug, thence through the link to the other lug and thence to the other electrode.

4. The method of applying lugs to certain links of continuous chains, comprising feeding the chain by steps, holding each link by means engaging its interior, bringing a pair of lugs into contact with the link thus held, bringing a pair of electrodes into contact with the lugs, supplying current to the electrodes, applying pressure between the link and electrodes while the current is flowing, repeating such operation for a number of links, and thereafter feeding at one time a length of chain including several links which are to be left without lugs.

5. The method of applying lugs to a chain link, comprising holding a pair of lugs in contact with a link and bringing a pair of electrodes of opposite polarity into contact with the lugs, and applying current to pass from one electrode through one lug thence through the link to the other lug and thence to the other electrode.

6. The method of applying lugs to a chain link, comprising holding a pair of lugs in contact with a link and bringing a pair of electrodes into contact with the lugs, supplying current to the electrodes, and applying pressure between the link and electrodes to deform the link while the current is flowing.

7. The method of applying lugs to links of chains, comprising feeding the chain by steps and applying a lug with each feeding operation, and thereafter feeding at one time a length of chain including several links.

8. In the method of applying lugs to links of chains, comprising feeding the chain by steps corresponding to a single link and applying a lug to each link, and feeding at one time a length of chain corresponding to several links and applying a lug to an end link of such group.

9. In the manufacture of chain having alternate groups of lugged links and unlugged links, the steps of feeding single links to a welding device, and thereafter feeding a plurality of links in a cycle of operation corresponding to the feeding of a single link.

10. In the manufacture of chain having alternate groups of lugged links and unlugged links, the steps of feeding single links to a welding device, feeding lugs to such links, electrically welding a pair of lugs to each of several links, and thereafter feeding a plurality of links without the application of lugs thereto in a cycle of operation corresponding to the feeding of a single link.

11. The method of making chain having alternate groups of lugged links and unlugged links, comprising periodically feeding a link at a time a chain originally without lugs, welding lugs successively to successive links of the chain aid then feeding in one operation a plurality of links.

12. The method of making cross chains for tire chains, comprising feeding continuous chain of plain connected links, a link at a time, applying a pair of lugs to the opposite corners of each link so fed and electrically welding them thereto, then after a number of links have had lugs welded to them, feeding the chain a distance covering at least four links, this feed being effected in a cycle of operation corresponding to each of the preceding cycles, and then welding a pair of lugs onto opposite corners of the last link of the fed group which last link becomes the first welded link of the succeeding group and leaves at least three plain links between that group and the preceding welded group, thereafter severing the chain through the mid-link of the plain groups to produce short chains each having an intermediate group of lugged links and one or more plain links at each end thereof, and thereafter applying attaching devices to the terminal plain links of such short chains.

In testimony whereof, I hereunto affix my signature.

MERRITT R. WELLS.